Oct. 9, 1928.

H. D. STEVENS 1,687,465

METHOD AND APPARATUS FOR RESURFACING SOLID TIRES

Filed Oct. 14, 1924     3 Sheets-Sheet 1

INVENTOR.
Horace D. Stevens
BY
ATTORNEY.

Oct. 9, 1928.  1,687,465

H. D. STEVENS

METHOD AND APPARATUS FOR RESURFACING SOLID TIRES

Filed Oct. 14, 1924  3 Sheets-Sheet 3

INVENTOR.
Horace D. Stevens
BY
ATTORNEY.

Patented Oct. 9, 1928.

1,687,465

UNITED STATES PATENT OFFICE.

HORACE D. STEVENS, OF AKRON, OHIO, ASSIGNOR TO THE FIRESTONE TIRE AND RUBBER COMPANY, OF AKRON, OHIO, A CORPORATION OF OHIO.

METHOD AND APPARATUS FOR RESURFACING SOLID TIRES.

Application filed October 14, 1924. Serial No. 743,581.

This invention relates to apparatus for resurfacing solid tires.

The purpose of the invention, in general, is to provide an efficient machine in which worn solid tires may be mounted and the worn tread surface thereof removed. In particular it has for its object the provision of means for mounting and rotating a solid tire and means for advancing a knife transversely of the periphery of the tire to slice off the worn tread surface, the latter means preferably being so mounted as to be moved out of operative position to facilitate mounting or removal of the tires on the machine. A further purpose is to provide an effective method for resurfacing solid tires.

The invention will be better understood when the following specific description of one form of the invention is read in connection with the accompanying drawings, it being understood that the invention is not limited to the specific structure described and illustrated.

Figure 1:
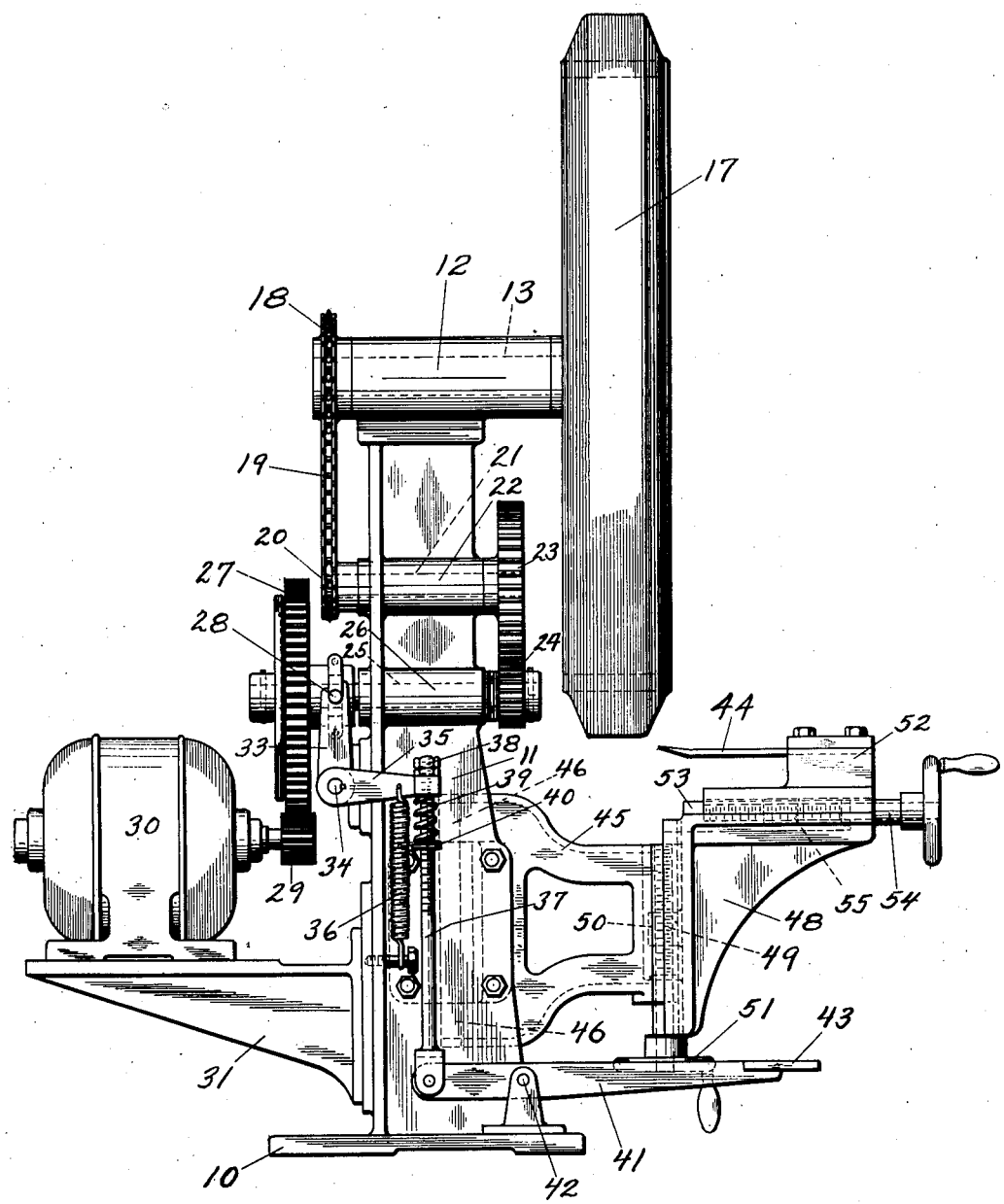
Figure 1 is a side elevation of a machine constructed according to the invention.
Figure 2:
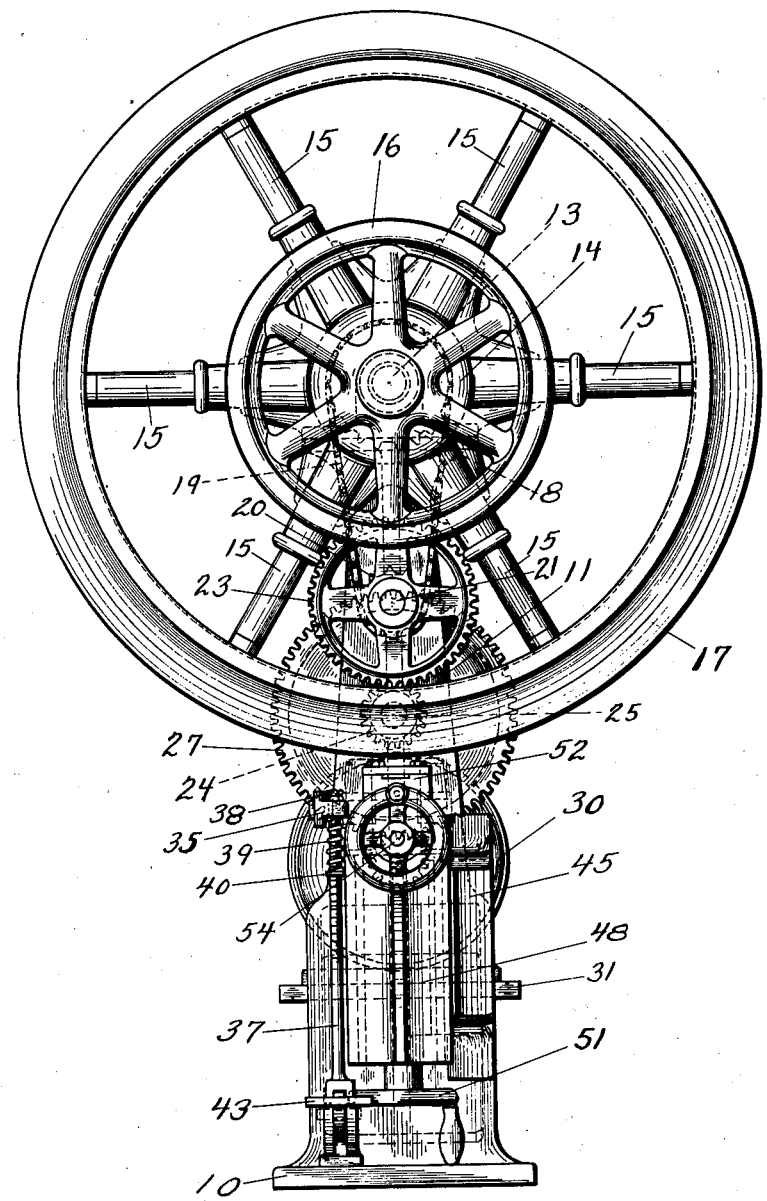
Figure 2 is a front elevation thereof.

Referring to the drawings, 10 is a base on which is formed an up-standing bracket 11 provided at its top with a bearing 12 in which is rotatably mounted a shaft 13 on which is secured a suitable form of chuck 14 having radially movable arms 15, 15 operable as will be understood by hand wheel 16 and adapted to support for rotation various sizes of solid tires such as indicated at 17 preferably for rotation in a vertical plane.

For rotating tire 17, a sprocket 18 is secured on shaft 13 and has trained thereover a chain 19 adapted to be driven by a second sprocket 20 which latter is secured on a shaft 21. The shaft 21 is journaled in a bearing 22 formed in the bracket 11 and has a gear 23 thereon meshing with a gear 24 on a second shaft 25 journaled in a bearing 26 formed in frame 11. Shaft 25 is adapted to be driven by a gear 27 rotatably mounted thereon and adapted to be clutched thereto by a suitable clutch 28. A gear 29 driven by a motor 30 is meshed with gear 27 whereby the latter may be continuously driven. Motor 30 may be mounted on a bracket 31 secured or formed on bracket 11. It will be noted from the drawings that the speed of the motor is reduced by the various gears and sprockets so that the tire 17 will rotate slowly but with sufficient power to effect the cutting of the surface therefrom as will later be explained.

Clutch 28 is adapted to be manually operated by the following mechanism. An arm 33, pivoted on bracket 11 at 34, is arranged to engage and slide the clutch 28 on shaft 25. Secured to arm 34 is an arm 35 in effect forming a bell crank lever with the former arm. Arm 35 is normally held by a spring 36, secured thereto and to the bracket 11, so as to hold the clutch 28 out of engagement with gear 27. For moving arm 35 to force the clutch in engagement against the action of spring 36, a rod 37 is connected to arm 35 by nuts 38, on the upper end of the rod and by a compression spring 39 on the rod between the arm 35 and an adjustable flange 40 screw threadly mounted on the rod. At its lower end rod 37 is connected to one end of a pedal lever 41 which is fulcrumed at 42 on the base 10 and is formed with a pedal 43 on its other end extending out in front of the machine.

Figure 3:
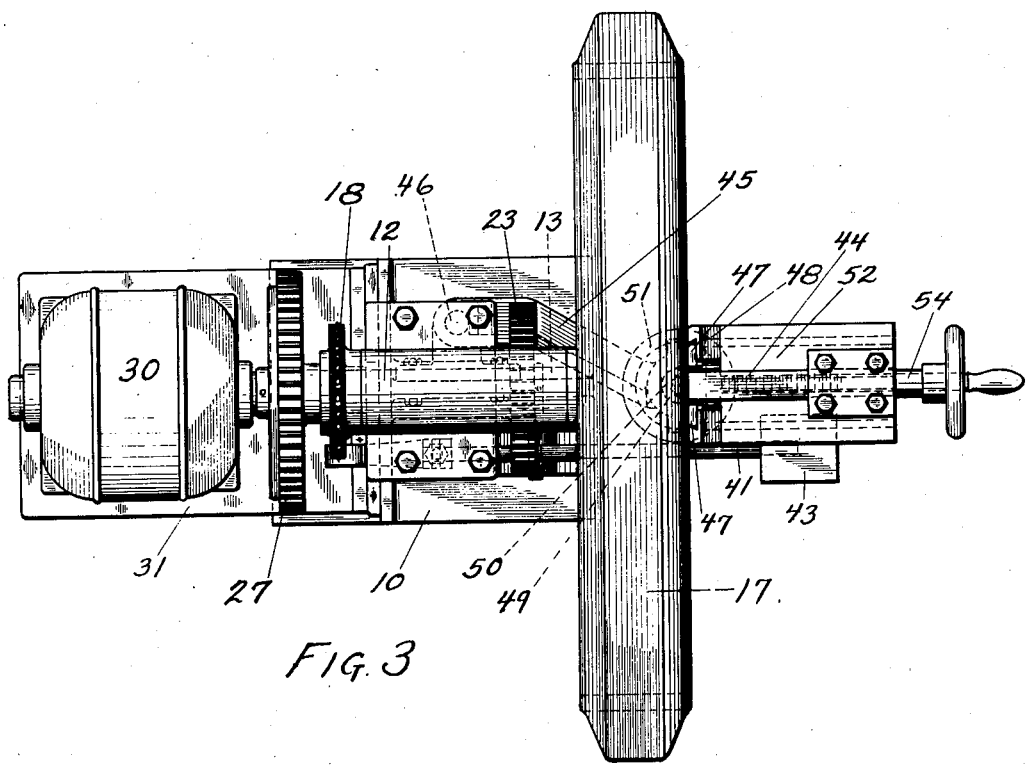
Figure 3 is a plan thereof.

The tread removing knife, represented by numeral 44, which later will be more fully described, is mounted so as to be movable out of the way of an operator during the mounting or dismounting of a tire in or from the machine and also is mounted for movement radially of the tire and transversely of its periphery. The mechanism for supporting and carrying the knife accordingly includes an arm 45, pivoted at 46, 46, on bracket 11, and formed as best shown in Figure 3 so as to carry knife 44 into a position in which it will engage the periphery of the tire at its lowermost point.

The arm 45 has under-cut guide ribs 47, 47, formed down its outer end and adapted to slidably receive a bracket 48 having correspondingly under-cut slots engaging the ribs. Bracket 48 is adapted to be moved on arm 45 by a threaded shaft 49 journaled on arm 45 and screw threadedly engaging an apertured lug 50 formed on bracket 48 and extending therefrom between ribs 47, 47. Shaft 49 is adapted to be rotated by hand wheel 51.

Knife 44 is mounted on a bracket 52 which is slidable on ribs indicated at 53 on bracket 48, whereby the knife 44 can be fed transversely of the tire, the feeding means comprising a threaded shaft 54 journalled on bracket 48 and engaged in threaded apertured lug 55 formed on the under surface of bracket 52.

Figure 4:
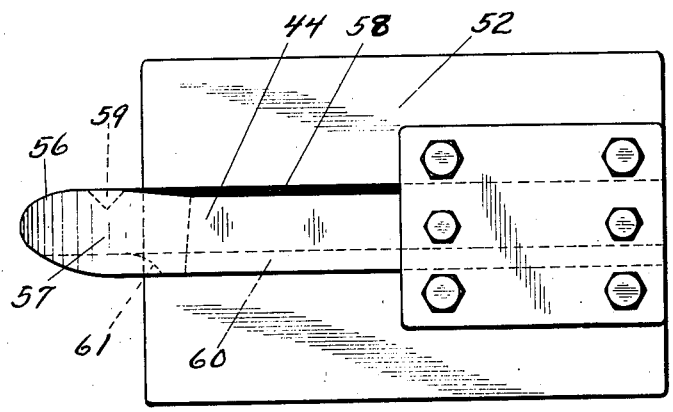
Figure 4 is an enlarged detail plan of the knife.
Figure 5:
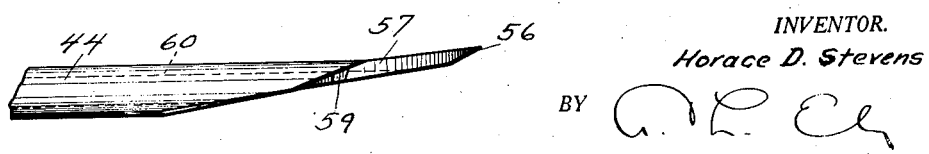
Figure 5 is a side elevation thereof.

As shown in Figures 4 and 5, knife 44 is of a peculiar shape. This shape has been found to be the only practical one for the purpose but the reasons underlying the same are somewhat obscure. The cutting edge of the knife is indicated at 56. From the cutting edge the blade is ground with a surface 57 inclined both longitudinally and transversely thereof, so that the cut rubber will be wedged apart both transversely and longitudinally. To prevent the forward edge of the knife from mutilating the rubber or binding in any way it is ground round as indicated at 58. Adjacent the cutting edge, the forward edge of the knife is also notched on its under surface as shown at 59, the notch apparently tending to break adhesion of the cut rubber to the knife and also to facilitate cooling of the knife by radiation. The knife is formed with a longitudinal groove 60 on its rear edge for the latter purpose, and it is also cut away on its under surface adjacent its rear edge as indicated at 61. As is apparent from Figures 1 and 5 the cutting end of the knife is tilted upwardly at a slight angle to the upper face of the knife so that the latter will clear the new surface of the tire as the knife advances transversely thereof.

In operation, arm 45 is swung rearwardly from the position shown in Figure 1 thus carrying bracket 48 and knife 44 to a position out of the way. A tire to be resurfaced is mounted on chuck 14. The arm 45 is then swung into operative position, a portion of the arm engaging the bracket 11 to prevent swinging of the latter too far. Wheel 51 is then operated to adjust knife 44 for the desired depth of cut and shaft 54 is rotated to feed the knife 44 across the face of the tread to slice the outer surface therefrom. A single cut may be made or, if desired or necessary, a plurality of cuts may be made to properly recondition the tire for further service. When the resurfacing operation is complete, the bracket 48 is again swung rearwardly and the tire removed.

Modifications of the invention may be resorted to without departing from the spirit thereof or the scope of the appended claims.

What is claimed is:

1. Apparatus for resurfacing solid rubber tires comprising means for supporting and rotating a tire, a movable knife, means for moving the knife from a remote position to a position adjacent the periphery of the tire, the blade of the knife being directed substantially transversely of the peripheral surface of a tire mounted on said supporting means, means for moving the knife radially of the tire in the last position and means for moving the knife transversely of the tire to cut a layer of stock from its outer surface.

2. That method of resurfacing solid rubber tires which comprises circumferentially driving a tire and cutting a slice of rubber from the periphery thereof by passing a knife transversely through the tire at a determinate distance inwardly from its periphery.

3. Apparatus for resurfacing solid tires comprising means for supporting and rotating a tire in a vertical plane, a knife, a pivoted arm for carrying the knife, a bracket vertically slidable on the arm, means on the arm for sliding said bracket, a second bracket horizontally slidable on the first bracket, on which second bracket said knife is mounted, and means on the first bracket for sliding the second bracket thereon.

HORACE D. STEVENS.